Patented Jan. 16, 1923.

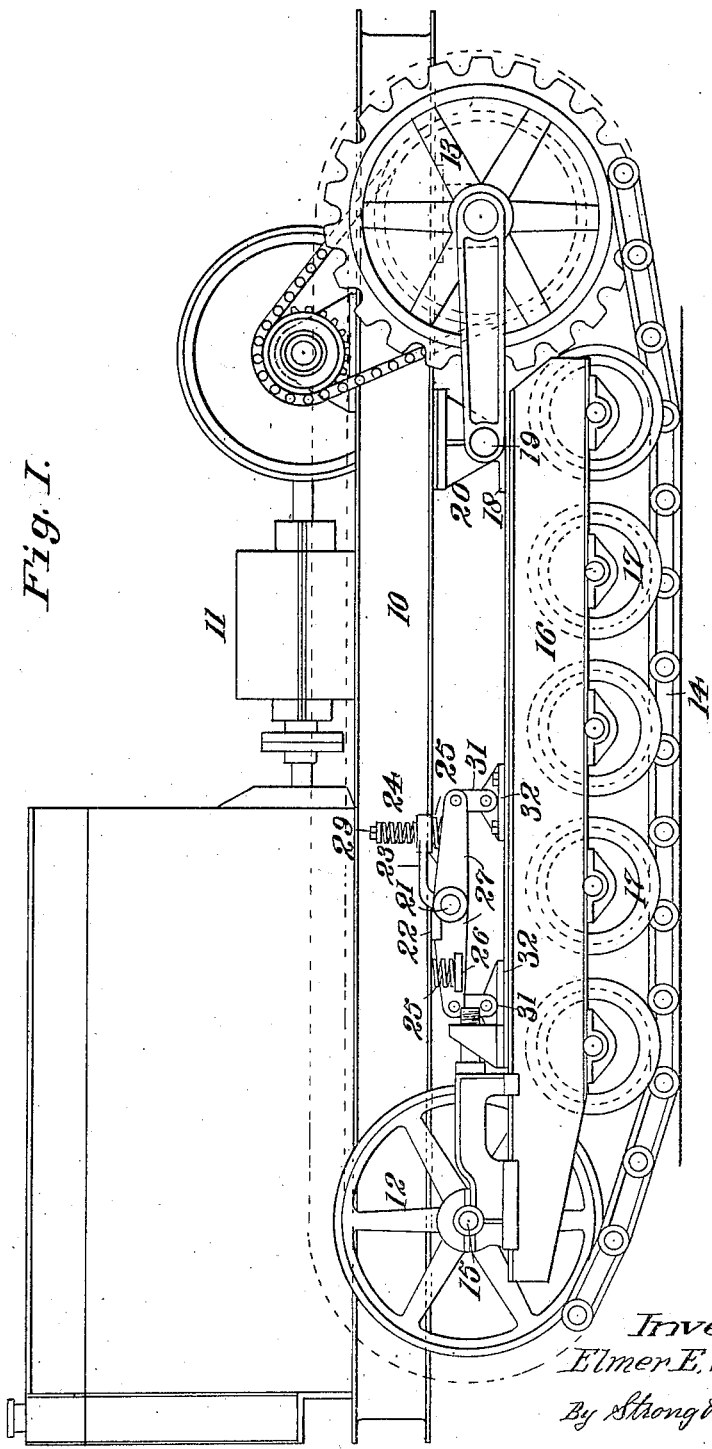

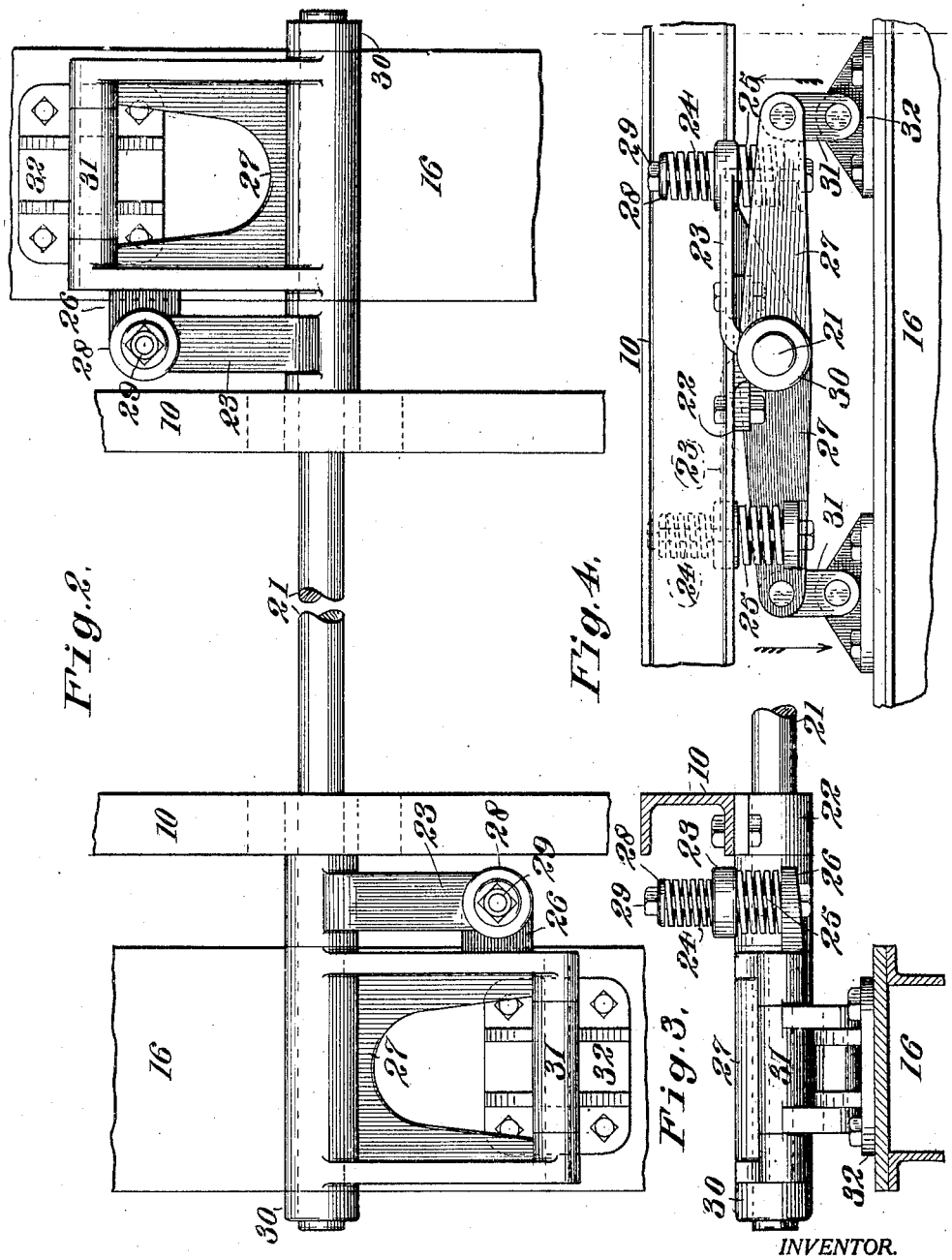

1,442,552

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

MAIN-FRAME SUSPENSION FOR TRACTORS.

Application filed August 15, 1918, Serial No. 249,962. Renewed June 1, 1921. Serial No. 474,293.

*To all whom it may concern:*

Be it known that I, ELMER E. WICKERSHAM, a citizen of the United States, residing at Stockton, in the county of San Joaquin and State of California, have invented new and useful Improvements in Main-Frame Suspensions for Tractors, of which the following is a specification.

This invention relates to a tractor, and particularly pertains to means for resiliently suspending the tractor frame from self-laying track trucks.

In a copending application, Serial No. 249,611, filed August 13th, 1918, I have shown and described an equalizer mechanism comprising a rock shaft journaled on the main frame and having connections with the truck mechanisms such that an upward movement of one truck imparts a downward movement to the other. The present application embodies the same idea, but discloses a simpler form of device wherein the gears shown in the above-mentioned application have been omitted.

The invention is illustrated by way of example in the accompanying drawings, in which—

Fig. 1 is a view in side elevation, illustrating a tractor equipped with the frame suspension with which the present invention is concerned.

Fig. 2 is a view in plan, illustrating the frame suspension mechanism.

Fig. 3 is a view in elevation, illustrating one end of the equalizer mechanism and disclosing its connection with the main frame and a track truck.

Fig. 4 is a fragmentary view in side elevation, illustrating the complete equalizer mechanism.

Referring more particularly to the drawings, 10 indicates a main frame which is adapted to be supported upon its opposite sides by self-laying truck units 11. Each of these units comprises a front idler wheel 12, a rear driving sprocket wheel 13 and an endless chain track 14 passing around said wheels. The front idler wheel is provided with an axle suitably housed within a bearing 15. This bearing is mounted at the forward end of a roller truck frame 16. The roller truck frame carries a series of load-supporting rollers 17 which travel along the lower run of the chain track. The rear ends of the roller frames 16 are provided with standards 18 which carry a transverse rock shaft 19. This shaft is also secured within hangers 20 depending from the main frame.

The previously described construction permits vertical swinging movement of the roller truck frames. It will be understood, however, that other constructions may be used and that, if desired, the roller truck frames may be formed of articulated truck sections rather than a single rigid frame member. The forward ends of the roller truck frames are connected with the main frame by means of the equalizer mechanism shown in Figs. 2, 3 and 4.

This mechanism consists of a transverse shaft 21 which is rotatably supported within bearings 22 bolted to the under face of each of the longitudinal frame members of the main frame. Fixed to the shaft 21, at points on the outside of the bearings 22, are radius arms 23. These arms extend in opposite directions and move in unison with the shaft. The outer ends of these arms are formed with upper and lower spring seats, upon which helical expansion springs 24 and 25 rest. The expansion spring 24 is interposed between the radius arm and a lug 26 formed upon a shackle arm 27. The spring 24 rests upon the arm 23 and is covered at its upper end with a washer 28. A bolt 29 extends downwardly through the washer, an opening in the radius rod, and the lug 26.

The shackle arms 27 are mounted to freely rotate upon the opposite ends of the shaft 21 and are held in place by stop collars 30. These shackle arms extend in opposite directions and are positioned to agree with the adjacent radius arms. The outer ends of the shackle arms are forked to receive stabilizing links 31. These links depend downwardly from pivot pins upon the ends of the shackle members and pivotally engage fastening brackets 32 which are secured to the upper faces of the roller frames 16.

In operation, inequalities in the roadway will cause the two roller trucks to swing vertically upon their fixed axis. This swinging movement will, therefore, affect the equalizer mechanism. It may be assumed that the right-hand truck is swinging upwardly while the opposite truck is continuing along a level plane. The upward movement of the truck will act through the lower spring 25 of the complementary radius arm 23 to swing this arm upwardly and thus rotate the shaft 21. This movement will swing the opposite arm downwardly and, after compressing the spring 25, will act through the shackle to draw the truck frame downwardly. The amount of movement of the upwardly swinging roller frame will be divided and the truck frame will move downwardly one half of the maximum movement of the roller frame, thus reducing the vibration of the main frame.

It will further be observed that irrespective of road conditions the frame will be continuously suspended upon springs which will act to absorb all minor vibrations of the two track truck units.

Having thus described my invention, what I claim and desire to secure by Letters Patent is:

1. In a tractor construction, a main frame, roller frames disposed at the opposite sides of the main frame, and forming a part of the self-laying track units, a transverse shaft carried by hangers upon the main frame, and upon which the roller frames are separately pivoted for vertical movement, a forward transverse shaft carried by the main frame, oppositely extending pressure arms fixed to said forward shaft, and yieldable connections between the roller frames and the pressure arms, whereby vertical movement of one roller frame in one direction would tend to produce vertical movement of the opposite roller frame in the opposite direction.

2. In a frame suspension for tractors having a main frame and opposite independently movable roller frames, a transverse equalizer shaft rotatably carried by the main frame, pressure arms fixed to the opposite ends of the shaft, and extending oppositely therefrom, freely pivoted shackle arms carried by the ends of the shafts, and connecting with the separate roller frames, and resilient means interposed between the shackle arms and the pressure arms, whereby movement of one shackle arm in one direction will tend to produce yieldable movement of the other shackle arm in the opposite direction.

3. A frame suspension for tractors having a main frame and opposite roller frames comprising a transverse shaft rotatably carried by the main frame, freely pivoted shackle links mounted upon the opposite ends of the shaft, and flexibly connected to the separate roller frames, pressure arms fixed upon the opposite ends of the shaft and extending oppositely to each other and parallel to complementary shackle links, a lug extending from each of the shackle links, and resilient means interposed between the lug and the pressure arms where relative movement of one shackle link will be yieldably transmitted to the opposite link through the opposite pressure arm.

4. In a tractor construction, a main frame, roller truck frames disposed at the opposite sides of the main frame and pivotally connected thereto for rocking movement in a vertical plane, and an equalizing connection between the main frame and each truck frame comprising a transverse shaft carried by the main frame, oppositely extending pressure arms fixed to said shaft and connections between each truck frame and adjacent pressure arm whereby vertical movement of one truck frame in one direction will tend to produce movement of the opposite truck frame in the opposite direction.

5. In a tractor construction, a main frame, a roller truck frame at each side thereof pivotally connected thereto for rocking movement in a vertical plane, a shaft rotatably mounted upon the main frame, crank arms carried by the opposite ends of the shaft and pivotally connected with the roller truck frames, said arms being oppositely extended whereby rocking movement of one of the truck frames will tend to produce rocking movement of the opposite truck frame in the opposite direction.

In testimony whereof I have hereunto set my hand in the presence of two subscribing witnesses.

ELMER E. WICKERSHAM.

Witnesses:
JOHN H. HERRING,
W. W. HEALEY.